March 7, 1933.  B. C. HARRELL  1,900,339
FIREFLY
Filed March 28, 1932
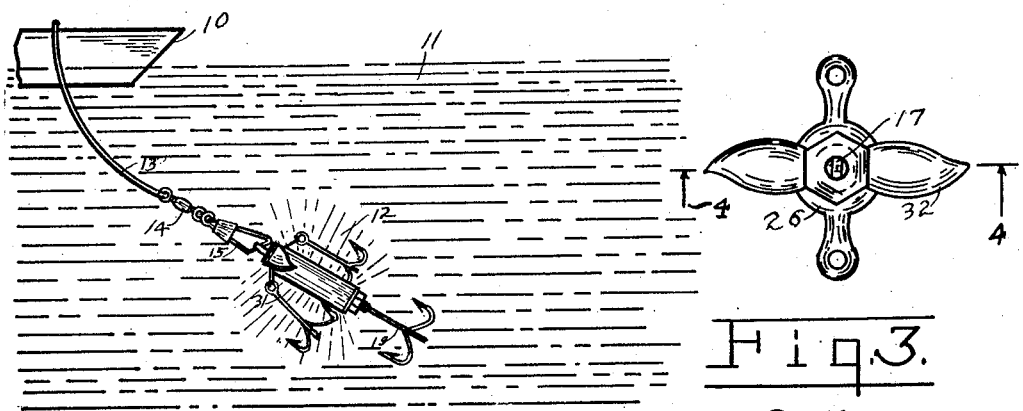
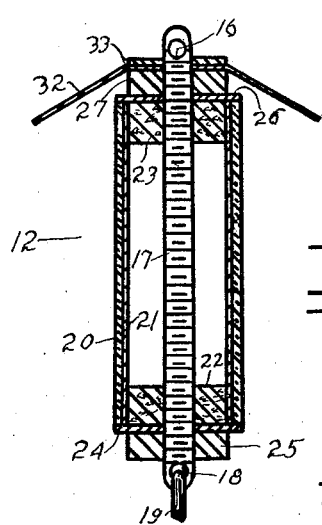
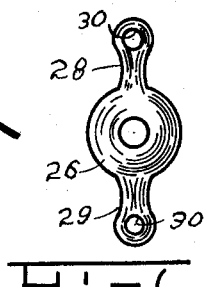
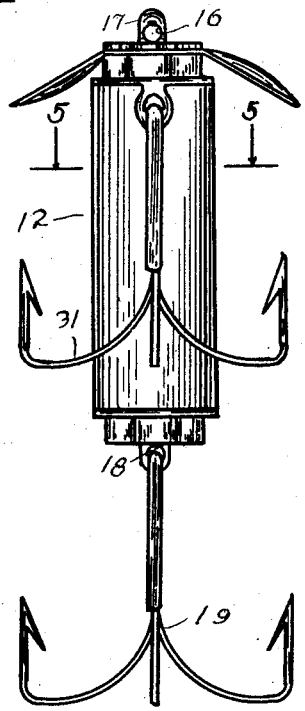
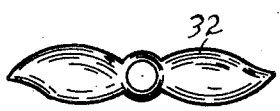
Inventor
Billington C. Harrell.
By Miller & Miller
Attorneys Patented Mar. 7, 1933

1,900,339

UNITED STATES PATENT OFFICE

BILLINGTON C. HARRELL, OF SAN ANTONIO, TEXAS

FIREFLY

Application filed March 28, 1932. Serial No. 601,623.

This invention relates to a fire fly or self illuminated fishing bait and has for an object to provide an improved fire fly which is simple to construct and easy to operate.

A further object of this invention is to provide an improved fire fly which is very attractive to fish and hence very efficient for the purpose for which it is intended.

A further object of this invention is to provide an improved fire fly for fishing purposes which becomes self illuminous for a substantial period of time after being exposed to a source of light for a short period of time, which illuminosity will be visible for a very substantial distance through the water.

Still a further object of this invention is to provide an improved artificial fire fly for fish bait, which will glow and rotate as it is thrown through the water, thus simulating the movement of the glow-worm or shrimp that is often used as fish bait.

Yet another object of this invention is to provide an improved fire fly that is made of a number of simple parts, easily and inexpensively assembled.

With the foregoing and other objects in view, as will hereinafter become apparent, this invention comprises the constructions, combinations and arrangements of parts, hereinafter set forth, disclosed and shown on the accompanying drawing. In this drawing, Figure 1 is an elevational view of this fire fly in operation.

Figure 2 is an enlarged elevational view of the fire fly per se.

Figure 3 is a top plan view of Figure 2.

Figure 4 is a section on lines 4—4 of Figure 3.

Figure 5 is a section on lines 5—5 of Figure 2.

Figure 6 is an elevational detached view of an arm for holding a pair of fish hooks, and Figure 7 is an elevational detached view of a propeller serving to rotate the fire fly as it is thrown through the water.

There is shown at 10 a fishing boat on a body of water 11 through which the fire fly 12 is being drawn by means of the fishing line 13. The fire fly 12 is secured by means of a usual swivel line attachment 14 and safety pin 15, the safety pin 15 passing through an opening 16 in the fire fly body bolt 17.

The fire fly 12 consists of the threaded bolt 17 having an opening 16 at one end thereof for receiving the safety pin 15, and an opening 18 at the other end thereof for receiving a fishing hook 19. The bolt 17 is threaded its full length and passes through a piece of glass tubing 20. This glass tubing 20 is painted on the inside thereof with a phosphorescent or luminous paint 21 and the ends thereof are closed by cork washers 22 and 23 threaded over the nut 17, a water proof varnish being painted thereover to insure the absence of any moisture inside of the glass tubing 20.

A washer 24 will be held against the bottom of the tube 20 by means of a nut 25, while a washer 26 will be held against the other end of the glass tubing 20 by means of a nut 27. The washer 26 has a pair of arms 28 and 29 projecting from opposite sides thereof, each arm having a recess 30 to receive the end of the fishing hook 31. A propeller 32 is secured on the bolt 17 next to the nut 27 by means of an additional nut 33.

In operation, the fire fly 12 will be assembled of the parts just described. If the phosphorescent paint 21 used therein is not permanently luminous it may be made temporarily luminous by exposing it to an artificial light such as a flashlight. This will cause the same to be luminous for a substantial period of time and it is then allowed to troll through the water 11 at the end of the line 13. The propeller 32 will cause the fly to rotate on the swivel 14 in a more or less erratic manner, thus simulating the movement of natural fish bait. As the fire fly rotates centrifugal force causes the hooks 31 to fly outwardly and thus be embedded more securely when the fly is taken by a fish.

The novel features and the operation of this device will be apparent from the foregoing description. While the device has been shown and the structure described in detail, it is obvious that this is not to be considered limited to the exact form disclosed and that changes may be made therein within the scope of what is claimed without departing from the spirit of the invention.

Having thus set forth and disclosed the nature of this invention, what is claimed is:

A fire fly comprising a body bolt, a glass tubing, a pair of cork washers within said tubing spacing said tubing from said body bolt, phosphorescent paint on the inside of said glass tubing, means for sealing the inside of said glass tubing water tight, washer means on the outer sides of said cork washers, a nut on the outside of each washer means for holding the same assembled, fish hook supporting arms integrally projecting from one of said washers, a propeller on said body bolt, a second nut holding said propeller securely thereon, means in said body bolt for attaching the same to a swivel line, and means in said body bolt for receiving another fish hook.

In testimony whereof I affix my signature.

BILLINGTON C. HARRELL.